(12) United States Patent
Nakamura (10) Patent No.: US 7,357,121 B2
(45) Date of Patent: *Apr. 15, 2008

(54) CONTROL APPARATUS FOR INTERNAL COMBUSTION ENGINE

(75) Inventor: Naoto Nakamura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/342,665

(22) Filed: Jan. 31, 2006

(65) Prior Publication Data

US 2006/0207554 A1 Sep. 21, 2006

(30) Foreign Application Priority Data

Mar. 18, 2005 (JP) .............................. 2005-078283

(51) Int. Cl.
*F02B 17/00* (2006.01)

(52) U.S. Cl. .................. 123/431; 123/300; 123/406.55

(58) Field of Classification Search ................ 123/299, 123/300, 431, 491, 685, 686, 406.55
See application file for complete search history.

(56) References Cited

U.S. PATENT DOCUMENTS

| 6,178,943 B1 | 1/2001 | Taga et al. | |
|---|---|---|---|
| 6,314,940 B1 | 11/2001 | Frey et al. | |
| 7,055,501 B2* | 6/2006 | Tanaka | 123/406.47 |
| 7,134,420 B2* | 11/2006 | Miyashita | 123/299 |
| 7,159,568 B1* | 1/2007 | Lewis et al. | 123/431 |
| 2003/0089331 A1* | 5/2003 | Ueda et al. | 123/295 |
| 2004/0040550 A1 | 3/2004 | Someno et al. | |
| 2004/0194737 A1 | 10/2004 | Miyashita | |
| 2005/0172931 A1 | 8/2005 | Mori | |
| 2005/0178356 A1* | 8/2005 | Shibagaki | 123/339.14 |
| 2005/0178360 A1* | 8/2005 | Satou | 123/431 |

FOREIGN PATENT DOCUMENTS

| EP | 0 937 880 A2 | 8/1999 |
|---|---|---|
| EP | 1 039 112 A2 | 9/2000 |
| EP | 1 288 484 A2 | 3/2003 |
| EP | 1 464 814 A2 | 10/2004 |
| EP | 1 561 936 A2 | 8/2005 |
| JP | A 2001-020837 | 1/2001 |

* cited by examiner

*Primary Examiner*—Erick Solis
(74) *Attorney, Agent, or Firm*—Oliff & Berridge, PLC (57) ABSTRACT

An engine ECU executes a program including the steps of: calculating a fuel injection ratio of an in-cylinder injector; calculating an amount of spark advance using a first map employed when the in-cylinder injector has a fuel injection ratio of one, said first map providing a timing of ignition with a maximum amount of spark advance; calculating an amount of spark advance using a second map employed for a fuel injection ratio of zero, said second map providing a timing of ignition with a minimum amount of spark advance; and calculating an amount of spark advance using a third map employed for a fuel injection ratio larger than zero and smaller than one, said third map providing a timing of ignition with a larger amount of spark advance for a larger ratio.

18 Claims, 6 Drawing Sheets

CONTROL APPARATUS FOR INTERNAL COMBUSTION ENGINE

This nonprovisional application is based on Japanese Patent Application No. 2005-078283 filed with the Japan Patent Office on Mar. 18, 2005, the entire contents of which are hereby incorporated by reference.

BACKGROUND OF THE INVENTION

1. Field of the Invention

The present invention relates to a control apparatus for an internal combustion engine having a first fuel injection mechanism (an in-cylinder injector) for injecting a fuel into a cylinder and a second fuel injection mechanism (an intake manifold injector) for injecting a fuel into an intake manifold or an intake port, and relates particularly to a technique for determining a timing of ignition with a fuel injection ratio between the first and second fuel injection mechanisms considered.

2. Description of the Background Art

An internal combustion engine having an intake manifold injector injecting a fuel into an intake manifold of the engine and an in-cylinder injector injecting a fuel into a combustion chamber of the engine, and configured to stop fuel injection from the intake manifold injector when the engine load is lower than a preset load and to cause fuel injection from the intake manifold injector when the engine load is higher than the set load, is known.

In such an internal combustion engine, one configured to switch between stratified charge combustion and homogeneous combustion in accordance with its operation state is known. In the stratified charge combustion, the fuel is injected from the in-cylinder injector during a compression stroke to form a stratified air-fuel mixture locally around a spark plug, for lean combustion of the fuel. In the homogeneous combustion, the fuel is diffused in the combustion chamber to form a homogeneous air-fuel mixture, for combustion of the fuel.

Japanese Patent Laying-Open No. 2001-020837 discloses a fuel injection control apparatus for an engine that switches between stratified charge combustion and homogeneous combustion in accordance with an operation state and that has a main fuel injection valve for injecting a fuel directly into a combustion chamber and a secondary fuel injection valve for injecting a fuel into an intake port of each cylinder. This fuel injection control apparatus for the engine is characterized in that the fuel injection ratio between the main fuel injection valve and the secondary fuel injection valve is set in a variable manner based on an operation state of the engine.

According to this fuel injection control apparatus for the engine, the stratified charge combustion is carried out using only the main fuel injection valve directly injecting the fuel into the combustion chamber, while the homogeneous combustion is carried out using both the main fuel injection valve and the secondary fuel injection valve (or using only the secondary fuel injection valve in some cases). This can keep the capacity of the main fuel injection valve small, even in the case of an engine of high power. Linearity in injection duration/injection quantity characteristic of the main fuel injection valve in a low-load region such as during idling is improved, which in turn improves accuracy in control of the fuel injection quantity. Accordingly, it is possible to maintain favorable stratified charge combustion, and thus to improve stability of the low-load operation such as idling. In the homogeneous combustion, both the main and secondary fuel injection valves are employed, so that the benefit of the direct fuel injection and the benefit of the intake port injection are both enjoyed. Accordingly, favorable homogeneous combustion can also be maintained.

In the fuel injection control apparatus for the engine disclosed in Japanese Patent Laying-Open No. 2001-020837, the stratified charge combustion and the homogeneous combustion are employed according to the situations, which complicates ignition control, injection control and throttle control, and requires control programs corresponding to the respective combustion manners. Particularly, upon switching between the combustion manners, these controls require considerable changes, making it difficult to realize desirable controls (of fuel efficiency, emission purification performance) at the time of transition. Further, in the stratified combustion region where lean combustion is carried out, the three-way catalyst does not work, in which case a lean NOx catalyst needs to be used, leading to an increased cost.

Based on the foregoing, an engine has also been developed which does not provide stratified charge combustion, and thus does not need control for switching between the stratified charge combustion and the homogeneous combustion and does not require an expensive lean NOx catalyst.

In controlling the engine to be ignited with its coolant having lower temperature, spark advance is introduced for correction. This is because when the coolant has lower temperature (poorer atomization is provided) lower combustion rates are provided and the engine is less prone to knock. The spark advance can provide an increased period of time between ignition and exhaust, and despite lower combustion rates the air fuel mixture can sufficiently be combusted.

For a range having the in-cylinder and intake manifold injectors bearing shares, respectively, of injecting fuel, however, the in-cylinder injector injects the fuel directly into the combustion chamber and the combustion chamber can have an internal temperature significantly effectively reduced, whereas the intake manifold injector injects the fuel in the intake manifold and as a result the combustion chamber has an internal temperature less effectively reduced. The fuel injected through the in-cylinder injector reduces the combustion chamber's internal temperature to an extent, whereas that through the intake manifold injector does so to a different extent. If the combustion chamber's temperature difference varies, anti-knock performance varies, and the combustion chamber's internal temperature is reduced and anti-knock performance is improved. If anti-knock performance varies, an optimal timing of ignition varies. As such, using the coolant's temperature alone to calculate an amount of spark advance cannot provide an accurate timing of ignition (or an accurate amount of spark advance). Note that Japanese Patent Laying-open No. 2001-020837 only discloses that each injector is driven to achieve a fuel injection ratio corresponding to the operation state of interest and a timing of ignition is set, and the document does not provide a solution to the problem described above.

SUMMARY OF THE INVENTION

An object of the present invention is to provide a control apparatus for an internal combustion engine having first and second fuel injection mechanisms bearing shares, respectively, of injecting fuel into a cylinder and an intake manifold, respectively, that can calculate an accurate timing of ignition.

The present invention in one aspect provides a control apparatus for an internal combustion engine having a first fuel injection mechanism injecting fuel into a cylinder and a second fuel injection mechanism injecting the fuel into an intake manifold. The control apparatus includes: a controller controlling the first and second fuel injection mechanisms to bear shares, respectively, of injecting the fuel at a ratio calculated as based on a condition required for the internal combustion engine, the ratio including preventing one of the fuel injection mechanisms from injecting the fuel; and an ignition timing controller controlling an ignition device to vary a timing of ignition. The ignition timing controller controls the ignition device, as based on a reference timing of ignition of the internal combustion engine determined from the ratio.

In accordance with the present invention for a range having the first fuel injection mechanism (e.g., an in-cylinder injector) and the second fuel injection mechanism (e.g., an intake manifold injector) bearing shares, respectively, of injecting the fuel the fuel injected through the in-cylinder injector reduces the combustion chamber's internal temperature. If the combustion chamber's internal temperature is reduced, anti-knock performance is enhanced, and a timing of ignition can be advanced. In contrast, the fuel injected through the intake manifold injector reduces the combustion chamber's internal temperature in a degree smaller than that through the in-cylinder injector does. Thus the internal combustion engine having two fuel injection mechanisms bearing shares, respectively, of injecting fuel, and reducing the combustion chamber's internal temperature in different degrees, respectively, can achieve an accurately set timing of ignition. As a result a control apparatus that can calculate an accurate timing of ignition can be provided for an internal combustion engine having first and second fuel injection mechanisms bearing shares, respectively, of injecting fuel to inject the fuel into a cylinder and an intake manifold, respectively, that are implemented by two types of fuel injection mechanisms injecting fuel differently.

The present invention in another aspect provides a control apparatus for an internal combustion engine having a first fuel injection mechanism injecting fuel into a cylinder and a second fuel injection mechanism injecting the fuel into an intake manifold. The control apparatus includes: a controller controlling the first and second fuel injection mechanisms to bear shares, respectively, of injecting the fuel at a ratio calculated as based on a condition required for the internal combustion engine, the ratio including preventing one of the fuel injection mechanisms from injecting the fuel; a storage storing a reference timing of ignition; and an ignition timing controller employing the reference timing of ignition to control an ignition device. The storage stores the reference timing of ignition calculated as based on the ratio.

In accordance with the present invention the storage stores a reference timing of ignition allowing a timing of ignition to be faster when the in-cylinder injector, which can reduce the combustion chamber's internal temperature by its injected fuel in a large degree, has a higher fuel injection ratio (including injecting fuel through the in-cylinder injector alone) than when the intake manifold injector, which reduces the combustion chamber's internal temperature by its injected fuel in a small degree, has a higher fuel injection ratio (including injecting fuel through the intake manifold injector alone). Thus the internal combustion engine having two fuel injection mechanisms bearing shares, respectively, of injecting fuel, and reducing the combustion chamber's internal temperature in different degrees, respectively, can achieve an accurately set timing of ignition. As a result a control apparatus that can calculate an accurate timing of ignition can be provided for an internal combustion engine having first and second fuel injection mechanisms bearing shares, respectively, of injecting fuel to inject the fuel into a cylinder and an intake manifold, respectively, that are implemented by two types of fuel injection mechanisms injecting fuel differently.

Preferably the storage stores in a form of a map the reference timing of ignition previously calculated as based on the ratio.

In accordance with the present invention the reference timing of ignition can be determined from that stored in a map as based on a fuel injection ratio of the in-cylinder and intake manifold injectors.

Still preferably, the storage stores the reference timing of ignition divided into a first map applied when the first fuel injection mechanism alone injects the fuel, a second map applied when the second fuel injection mechanism alone injects the fuel, and a third map applied when the first and second fuel injection mechanisms inject the fuel.

In accordance with the present invention an in-cylinder injector corresponding to one example of the first fuel injection mechanism and an intake manifold injector corresponding to one example of the second fuel injection mechanism that reduce the combustion chamber in temperature in different degrees, respectively, as they inject fuel, bear shares, respectively, of injecting fuel, and a reference timing of ignition is stored in a map divided into a first map applied when the in-cylinder injector alone injects the fuel, a second map applied when the intake manifold injector alone injects the fuel, and a third map applied when the in-cylinder and intake manifold injectors inject the fuel. A map can be selected as based on a fuel injection ratio between the in-cylinder and intake manifold injectors to determine a stored reference timing of ignition.

Still preferably the first map provides the reference timing of ignition set to provide spark advance.

In accordance with the present invention in the first map applied when the first fuel injection mechanism (e.g., an in-cylinder injector) alone injects fuel the fuel injected therethrough reduces the combustion chamber in temperature in a large degree and anti-knock performance is improved. Accordingly the reference timing of ignition can be set to be faster.

Still preferably the second map provides the reference timing of ignition set to provide spark retard.

In accordance with the present invention in the second map applied when the first fuel injection mechanism (e.g., an intake manifold injector) alone injects fuel the fuel injected therethrogh reduces the combustion chamber in temperature in a small degree and anti-knock performance is not improved. Accordingly the reference timing of ignition is set to be slower.

Still preferably the third map provides the reference timing of ignition set to provide spark advance when the first fuel injection mechanism is increased in the ratio.

In accordance with the present invention when the first fuel injection mechanism (e.g., the in-cylinder injector), which can reduce the combustion chamber's internal temperature by its injected fuel in a large degree, has a higher fuel injection ratio, anti-knock performance can be better than when the second fuel injection mechanism (e.g., the intake manifold injector), which reduces the combustion chamber's internal temperature by its injected fuel in a small degree, has a higher fuel injection ratio. As such, the reference timing of ignition can be advanced. Thus the internal combustion engine having two fuel injection mechanisms that bear shares, respectively, of injecting fuel and provide air fuel mixtures having different conditions, respectively, as they inject the fuel, can achieve an accurately set timing of ignition.

Still preferably the third map provides the reference timing of ignition set to provide spark retard when the second fuel injection mechanism is increased in the ratio.

In accordance with the present invention when the second fuel injection mechanism (e.g., the intake manifold injector), which reduces the combustion chamber in temperature by its injected fuel in a small degree, has a higher fuel injection ratio, anti-knock performance is less improved than when the first fuel injection mechanism (e.g., the in-cylinder injector), which can reduce the combustion chamber in temperature by its injected fuel in a large degree, has a higher fuel injection ratio. Accordingly, the reference timing of ignition is set to be slower. Thus the internal combustion engine having two fuel injection mechanisms that bear shares, respectively, of injecting fuel and provide air fuel mixtures having different conditions, respectively, as they inject the fuel, can achieve an accurately set timing of ignition.

Still preferably the first fuel injection mechanism is an in-cylinder injector and the second fuel injection mechanism is an intake manifold injector.

In accordance with the present invention a control apparatus can be provided that can calculate an accurate amount of spark advance for an internal combustion engine having first and second fuel injection mechanisms implemented by an in-cylinder injector and an intake manifold injector, respectively, separately provided and sharing injecting fuel when they share injecting the fuel in a cold state and a transitional period from the cold state to a warm state.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter reference will be made to the drawings to describe the present invention in an embodiment. In the following description identical components are identically denoted. They are also identical in name and function.

Note that while the following description is provided in conjunction with timing of ignition in a cold state and then refers to that for other than the cold state (as the combustion chamber's internal temperature is reduced, anti knock performance is improved and a timing of ignition is accordingly advanced.)

Note that while the following description is provided exclusively in conjunction with spark advance in a cold state, the present invention is not limited to such advance. The present invention also includes once introducing a spark advance and then a spark retard and introducing a spark retard from a reference timing of ignition. Furthermore, a relationship between a smaller spark advance for a higher ratio of fuel injected through an in-cylinder injector and a significantly large spark advance for a higher ratio of fuel injected through an intake manifold injector, can be inverted. For example if the performance of an in-cylinder injector 100 as a discrete injector and that of an intake manifold injector 120 as a discrete injector contribute to less sufficient atomization of the fuel injected through in-cylinder injector 100 than that of the fuel injected through intake manifold injector 120 for the same engine coolant temperature THW, the fuel injection ratio-spark advance relationship described above can be inverted.

Figure 1:
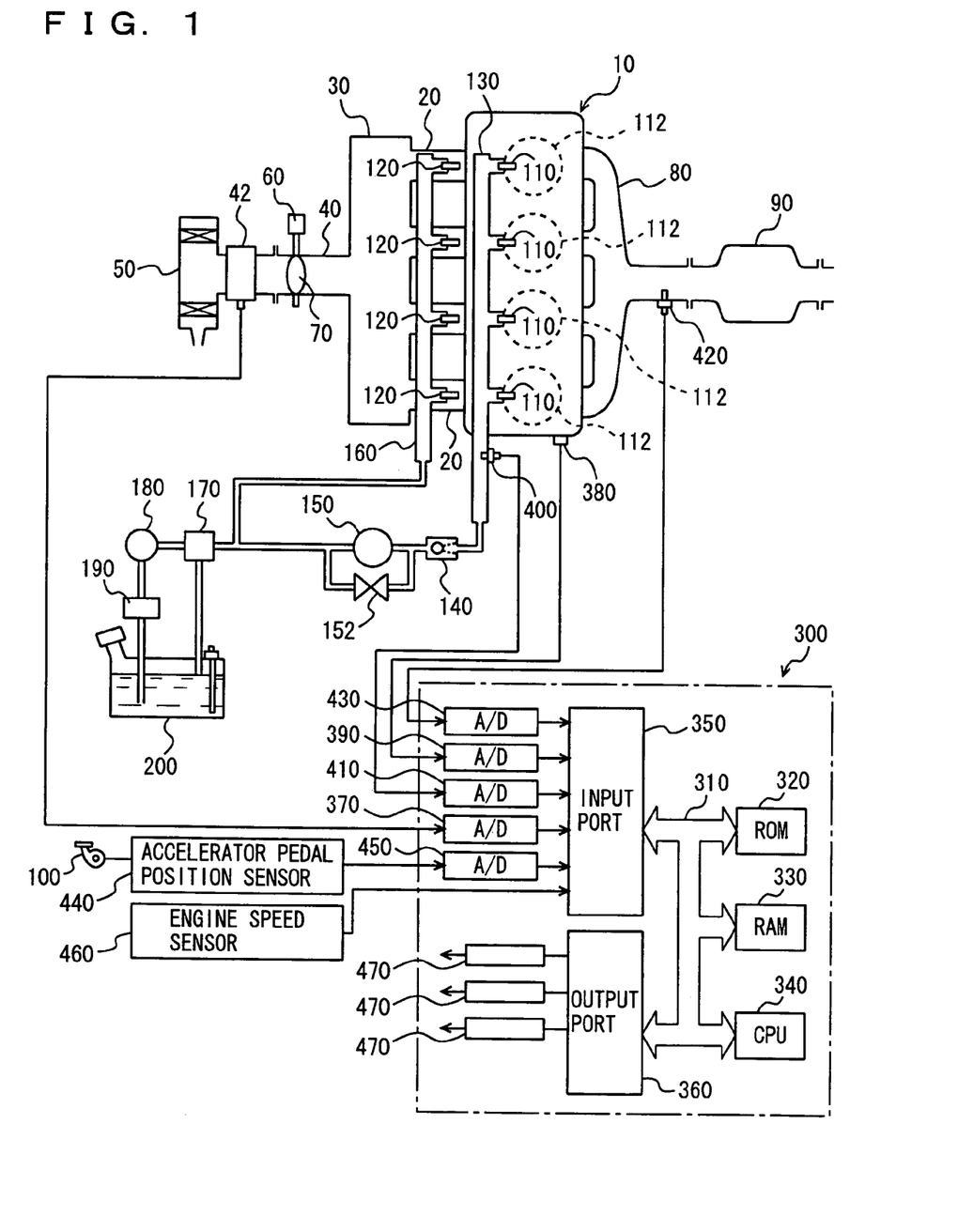
FIG. 1 a schematic configuration diagram of an engine system controlled by a control apparatus according to an embodiment of the present invention.

FIG. 1 is a schematic configuration diagram of an engine system that is controlled by an engine ECU (Electronic Control Unit) implementing the control apparatus for an internal combustion engine according to an embodiment of the present invention. In FIG. 1, an in-line 4-cylinder gasoline engine is shown, although the application of the present invention is not restricted to such an engine.

As shown in FIG. 1, the engine 10 includes four cylinders 112, each connected via a corresponding intake manifold 20 to a common surge tank 30. Surge tank 30 is connected via an intake duct 40 to an air cleaner 50. An airflow meter 42 is arranged in intake duct 40, and a throttle valve 70 driven by an electric motor 60 is also arranged in intake duct 40. Throttle valve 70 has its degree of opening controlled based on an output signal of an engine ECU 300, independently from an accelerator pedal 100. Each cylinder 112 is connected to a common exhaust manifold 80, which is connected to a three-way catalytic converter 90.

Each cylinder 112 is provided with an in-cylinder injector 110 injecting fuel into the cylinder and an intake manifold injector 120 injecting fuel into an intake port or/and an intake manifold. Injectors 110 and 120 are controlled based on output signals from engine ECU 300. Further, in-cylinder injector 110 of each cylinder is connected to a common fuel delivery pipe 130. Fuel delivery pipe 130 is connected to a high-pressure fuel pump 150 of an engine-driven type, via a check valve 140 that allows a flow in the direction toward fuel delivery pipe 130. In the present embodiment, an internal combustion engine having two injectors separately provided is explained, although the present invention is not restricted to such an internal combustion engine. For example, the internal combustion engine may have one injector that can effect both in-cylinder injection and intake manifold injection.

As shown in FIG. 1, the discharge side of high-pressure fuel pump 150 is connected via an electromagnetic spill valve 152 to the intake side of high-pressure fuel pump 150. As the degree of opening of electromagnetic spill valve 152 is smaller, the quantity of the fuel supplied from high-pressure fuel pump 150 into fuel delivery pipe 130 increases. When electromagnetic spill valve 152 is fully open, the fuel supply from high-pressure fuel pump 150 to fuel delivery pipe 130 is stopped. Electromagnetic spill valve 152 is controlled based on an output signal of engine ECU 300.

Each intake manifold injector 120 is connected to a common fuel delivery pipe 160 on a low pressure side. Fuel delivery pipe 160 and high-pressure fuel pump 150 are connected via a common fuel pressure regulator 170 to a low-pressure fuel pump 180 of an electric motor-driven type. Further, low-pressure fuel pump 180 is connected via a fuel filter 190 to a fuel tank 200. Fuel pressure regulator 170 is configured to return a part of the fuel discharged from low-pressure fuel pump 180 back to fuel tank 200 when the pressure of the fuel discharged from low-pressure fuel pump 180 is higher than a preset fuel pressure. This prevents both the pressure of the fuel supplied to intake manifold injector 120 and the pressure of the fuel supplied to high-pressure fuel pump 150 from becoming higher than the above-described preset fuel pressure.

Engine ECU 300 is implemented with a digital computer, and includes a ROM (Read Only Memory) 320, a RAM (Random Access Memory) 330, a CPU (Central Processing Unit) 340, an input port 350, and an output port 360, which are connected to each other via a bidirectional bus 310.

Airflow meter 42 generates an output voltage that is proportional to an intake air quantity, and the output voltage is input via an A/D converter 370 to input port 350. A coolant temperature sensor 380 is attached to engine 10, and generates an output voltage proportional to a coolant temperature of the engine, which is input via an A/D converter 390 to input port 350.

A fuel pressure sensor 400 is attached to fuel delivery pipe 130, and generates an output voltage proportional to a fuel pressure within fuel delivery pipe 130, which is input via an A/D converter 410 to input port 350. An air-fuel ratio sensor 420 is attached to an exhaust manifold 80 located upstream of three-way catalytic converter 90. Air-fuel ratio sensor 420 generates an output voltage proportional to an oxygen concentration within the exhaust gas, which is input via an A/D converter 430 to input port 350.

Air-fuel ratio sensor 420 of the engine system of the present embodiment is a full-range air-fuel ratio sensor (linear air-fuel ratio sensor) that generates an output voltage proportional to the air-fuel ratio of the air-fuel mixture burned in engine 10. As air-fuel ratio sensor 420, an $O_2$ sensor may be employed, which detects, in an on/off manner, whether the air-fuel ratio of the air-fuel mixture burned in engine 10 is rich or lean with respect to a theoretical air-fuel ratio.

Accelerator pedal 100 is connected with an accelerator pedal position sensor 440 that generates an output voltage proportional to the degree of press down of accelerator pedal 100, which is input via an A/D converter 450 to input port 350. Further, an engine speed sensor 460 generating an output pulse representing the engine speed is connected to input port 350. ROM 320 of engine ECU 300 prestores, in the form of a map, values of fuel injection quantity that are set in association with operation states based on the engine load factor and the engine speed obtained by the above-described accelerator pedal position sensor 440 and engine speed sensor 460, and correction values thereof set based on the engine coolant temperature.

Figure 2:
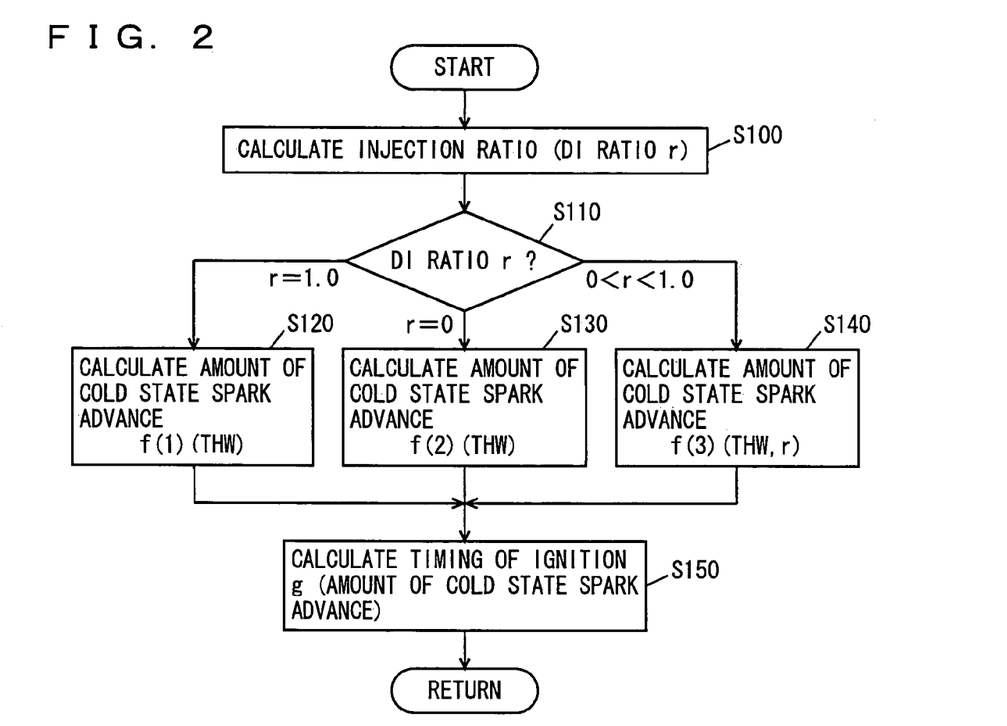
FIG. 2 is a flowchart (1) of a program executed by an engine ECU.

With reference to the flowchart of FIG. 2 engine ECU 300 of FIG. 1 executes a program having a structure for control, as described hereinafter.

Figure 3:
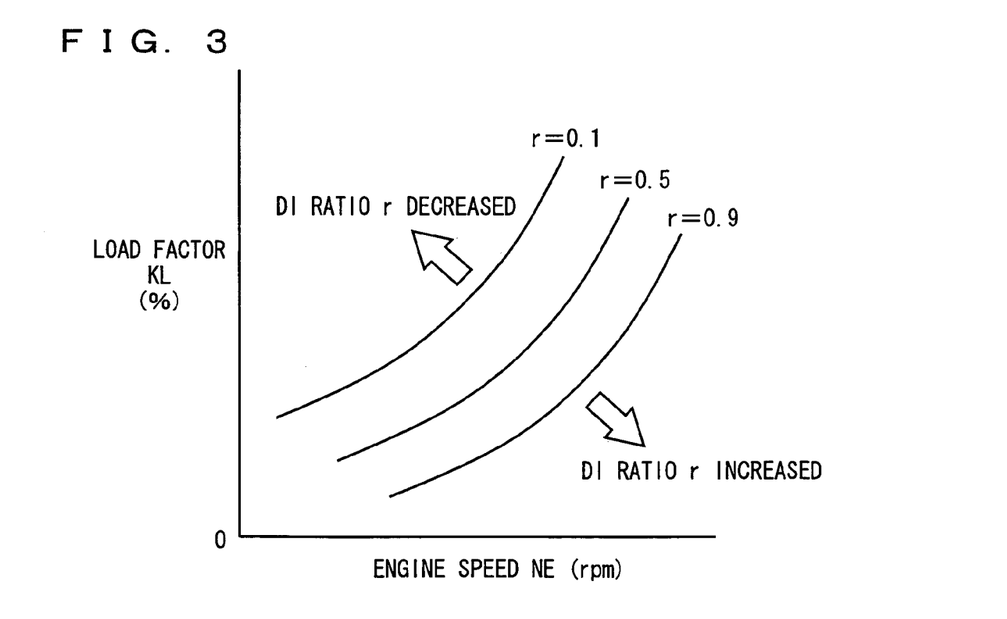
FIG. 3 shows an example of a map for shared injection.

In step (S) 100 engine ECU 300 employs a map as shown in FIG. 3 to calculate an injection ratio of in-cylinder injector 110. Hereinafter this ratio will be referred to as "DI ratio r," wherein $0 \leq r \leq 1$. The map used to calculate the ratio will be described later.

In S100 engine ECU 300 determines whether DI ratio r is 1, 0, or larger than 0 and smaller than 1. If DI ratio r is 1 (r=1.0 in S110) the process proceeds to S120. If DI ratio r is 0 (r=0 in S110) the process proceeds to S130. If DI ratio r is larger than 0 and smaller than 1 (0<r<1 in S110) the process proceeds to S140.

In S120 engine ECU 300 calculates an amount of cold state spark advance corresponding to that of spark advance for correction in a cold state when in-cylinder injector 110 alone injects fuel. This is done for example by employing a function f(1) to calculate an amount of cold state spark advance=f(1)(THW). Note that "THW" represents the temperature of a coolant of engine 10 as detected by coolant temperature sensor 380.

In S130 engine ECU 300 calculates an amount of cold state spark advance corresponding to that of spark advance for correction in the cold state when intake manifold injector 120 alone injects fuel. This is done for example by employing a function f(2) to calculate an amount of cold state spark advance=f(2)(THW).

In S140 engine ECU 300 calculates an amount of cold state spark advance corresponding to that of spark advance for correction in a cold state when in-cylinder and intake manifold injectors 110 and 120 bear shares, respectively, of injecting fuel. This is done for example by employing a function f(3) to calculate an amount of cold state spark advance=f(3)(THW, r). Note that "r" represents a DI ratio.

In S150 engine ECU 300 calculates a timing of ignition for example by employing a function g to calculate a timing of ignition=g (an amount of cold state spark advance).

Reference will now be made to FIG. 3 to describe an injection ratio ($0 \leq$ DI ratio $r \leq 1$) of in-cylinder injector 110 with an engine speed NE and a load factor KL of engine 10 serving as parameters.

In a low engine speed and high load range the fuel injected through in-cylinder injector 110 is insufficiently mixed with air, and in the combustion chamber the air fuel mixture tends to be inhomogeneous and thus provide unstable combustion. Accordingly, for this range, DI ratio r is reduced to increase an injection ratio (1−r) of intake manifold injector 120 to sufficiently mix the air fuel mixture before it is introduced into the combustion chamber.

In a high engine speed and low load range the air fuel mixture injected through in-cylinder injector 110 is readily homogenized. Accordingly, DI ratio r is increased. The fuel injected through in-cylinder injector 110 is vaporized within the combustion chamber involving latent heat of vaporization (by absorbing heat from the combustion chamber). Accordingly at the compression side the air fuel mixture is decreased in temperature and improved antiknock performance is provided. Furthermore, as the combustion chamber is decreased in temperature, improved intake efficiency can be achieved and high power output expected. Furthermore, in-cylinder injector 110 can have its end, exposed in the combustion chamber, cooled by the fuel and thus have its injection hole prevented from having deposit adhering thereto.

As based on the configuration and flowchart as described above, engine 10 in the present embodiment operates as described hereinafter. Note that in the following description "if the engine's coolant varies in temperature" and other similar expressions indicate a transitional period from a cold state to a warm state.

No Variation in DI Ratio and Variation Present in Temperature of Coolant for Engine When engine 10 starts, normally the coolant increases in temperature. More specifically, in FIG. 4, the coolant increases in temperature from a temperature TH(1) corresponding to a point A to a temperature TH(2) corresponding to a point B. The DI ratio is calculated (S100) and if DI ratio r is not found to have varied (e.g., r=0.7) a decision is made that it is larger than 0 and smaller than 1 (0<r<1.0 in S110) and function f(3) is accordingly used to calculate an amount of cold state spark advance by f(3) (THW, r) (S140).

Figure 4:
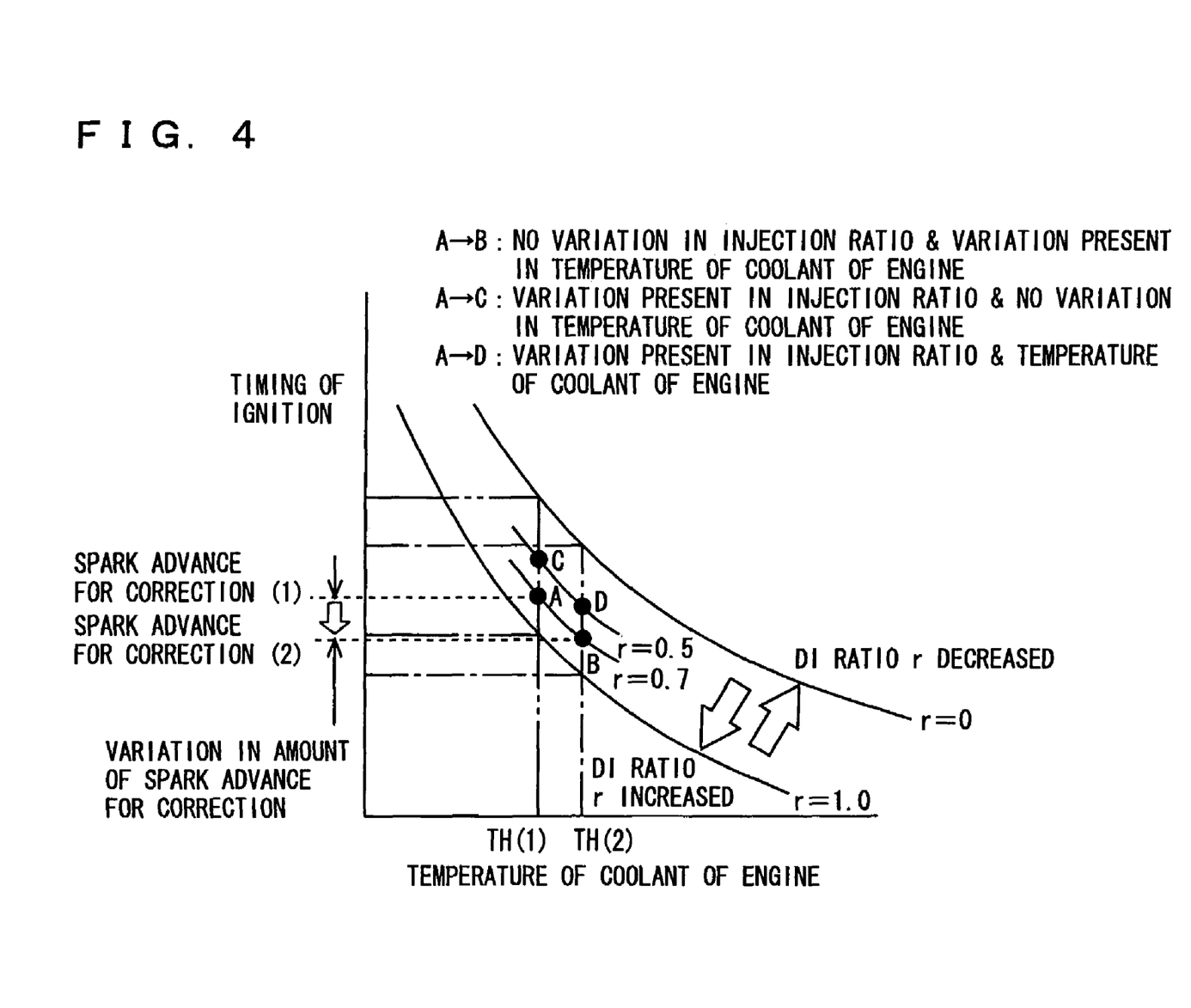
FIG. 4 illustrates how the engine's operation state varies.

In FIG. 4, for point A, by f(3) (TH(1), r), wherein r=0.7, an amount of cold state spark advance is calculated as a spark advance for correction (1). With the amount of cold state spark advance set at the spark advance for correction (1), engine 10 is operated, and temperature THW increases from TH(1) to TH(2) to reach point B. For point B, by f(3) (TH(2), r), wherein r=0.7, an amount of cold state spark advance is calculated as a spark advance for correction (2). In other words, an amount of spark advance for correction is reduced from the spark advance for correction (1) to the spark advance for correction (2) by a variation in amount of spark advance for correction, which is provided by the spark advance for correction (1) minus the spark advance for correction (2).

Variation Present in DI Ratio and No Variation in Temperature of Coolant for Engine While engine 10 is started, the coolant may not vary depending on the vehicle's surrounding (temperature in particular). If in such a case the engine 10 operation state varies and DI ratio r drops from 0.7, i.e., in FIG. 4, while temperature TH(1) corresponding to point A is held, a point C allowing DI ratio r smaller than 0.7 is attained (or it may be vice versa). The DI ratio is calculated (S100) and if DI ratio r is found to have varied (for example from 0.7 to 0.5) a decision is made that DI ratio r is still larger than 0 and smaller than 1 (0<r<1.0 in S110), and function f(3) is employed to calculate an amount of cold state spark advance by f(3) (THW, r) (S140).

In FIG. 4, for point A, by f(3) (TH(1), r), wherein r=0.7, an amount of cold state spark advance is calculated. In this condition engine 10 is operated, and while temperature THW is held at TH(1), DI ratio r decreases to reach point C. For point C, by f(3) (TH(1), r), wherein r=0.5, an amount of cold state spark advance is calculated. More specifically, a spark advance is introduced by a variation in amount of spark advance for correction. This indicates that a larger spark advance is introduced as the port's temperature is lower than the cylinder's internal temperature and the fuel injected through intake manifold injector 120 is hard to atomize.

Variation Present in DI ratio and Variation Present in Temperature of Coolant for Engine When engine 10 is started the coolant's temperature and DI ratio r may both vary. In such a case, in FIG. 4 point A corresponding to temperature TH(1) and DI ratio r=0.7 transitions to a point D corresponding to temperature TH(2) higher than TH(1) and a DI ratio r smaller than 0.7. The DI ratio is calculated (S100) and if DI ratio r is found to have varied (for example from 0.7 to 0.5) a decision is still made that DI ratio r is larger than 0 and smaller than 1 (0<r<1.0 in S110), and function f(3) is employed to calculate an amount of cold state spark advance by f(3) (THW, r) (S140).

In FIG. 4, for point A, by f(3) (TH(1), r), wherein r=0.7, an amount of cold state spark advance is calculated. In this condition engine 10 is operated, and while temperature THW changes from TH(1) to TH(2) the DI ratio also decreases to reach point D. For point D, by f(3) (TH(2), r), wherein r=0.5, an amount of cold state spark advance is calculated. More specifically, a timing of ignition is varied by a variation in amount of spark advance for correction. This indicates that when a DI ratio is neither 0 nor 1 an amount of cold state spark advance is calculated by a function of the coolant's temperature and DI ratio r, and a variation in amount of spark advance for correction also depends on those of the coolant in temperature and DI ratio r, respectively.

Thus in a cold state and a transitional period from the cold state to a warm state when an in-cylinder injector and an intake manifold injector bear shares, respectively, of injecting fuel, not only temperature THW of the coolant of the engine but DI ratio r is also used to calculate an amount of cold state spark advance. If the cylinder's interior and the port are different in temperature and thus have fuel therein atomized differently an accurate spark advance can be provided to combust the fuel satisfactorily.

Map of Reference Timing of Ignition Depending on Fuel Injection Ratio That Is Not Limited to Cold State Hereinafter will be described an embodiment that is not limited to low temperature of engine 10, or cold state. In the present embodiment in-cylinder injector 110 has a fuel injection ratio or DI ratio r divided into three values, i.e., r=0, r=1, and 0<r<1, and a reference timing of ignition is accordingly, previously stored in engine ECU 300 at ROM 320, RAM 340 or the like.

Fuel injected through in-cylinder injector 16 and that through intake manifold injector 120 decrease the combustion chamber in temperature in significantly different degrees, respectively. More specifically, the former, which is injected directly into the combustion chamber, and the latter, which is injected in the intake manifold and introduced into the combustion chamber, decrease the combustion chamber in temperature differently. More specifically, the latter decreases the combustion chamber in temperature in a small degree, whereas the former, injected directly into the combustion chamber, decreases the combustion chamber in temperature in a large degree. When the combustion chamber has low temperature, anti knock performance can be improved, and a timing of ignition can be set to be advanced.

A first map is set as a map applied for DI ratio r=1 (i.e., when in-cylinder injector 110 alone injects fuel) for a reference timing of ignition that allows a timing of ignition to be maximally advanced. Fuel injected through in-cylinder injector 110 decreases the combustion chamber in temperature maximally, and anti-knock performance can maximally be improved. The timing of ignition can be advanced and engine 10 can satisfactorily exhibit its characteristic(s).

A second map is set as a map applied for DI ratio r=0 (i.e., when intake manifold injector 120 alone injects fuel) for a reference timing of ignition that allows a timing of ignition to be maximally retarded. Fuel injected through intake manifold injector 120 decrease the combustion chamber in temperature in a small degree. From such decreased temperature of the combustion chamber, improved anti-knock performance is hardly expected. Accordingly the timing of ignition is retarded to prevent the engine from knocking.

A third map is set as a map applied for DI ratio r larger than 0 and smaller than 1 (i.e., when in-cylinder injector 110 and intake manifold injector 120 bear shares, respectively, of injecting fuel) for a reference timing of ignition that allows a timing of ignition to be advanced for higher DI ratios. As DI ratio r increases, in-cylinder injector 110 injects more fuel and the combustion chamber is accordingly decreased in temperature in a larger degree. Anti-knock performance can be improved, and the timing of ignition can be advanced.

Engine ECU 300 prepares three maps for such reference timings of ignition, and in accordance with a ratio of in-cylinder injector 110 bearing a share of injecting fuel, or DI ratio r, selects one of the maps to switch a map of a reference timing of ignition. In accordance with the selected map engine ECU 300 calculates a reference timing of ignition. In particular, the third map provides a reference timing of ignition varied by DI ratio r. Accordingly, not only the map but a function interpolating an intermediate portion set in the map may also be previously calculated and stored, and used to provide interpolation.

Figure 5:
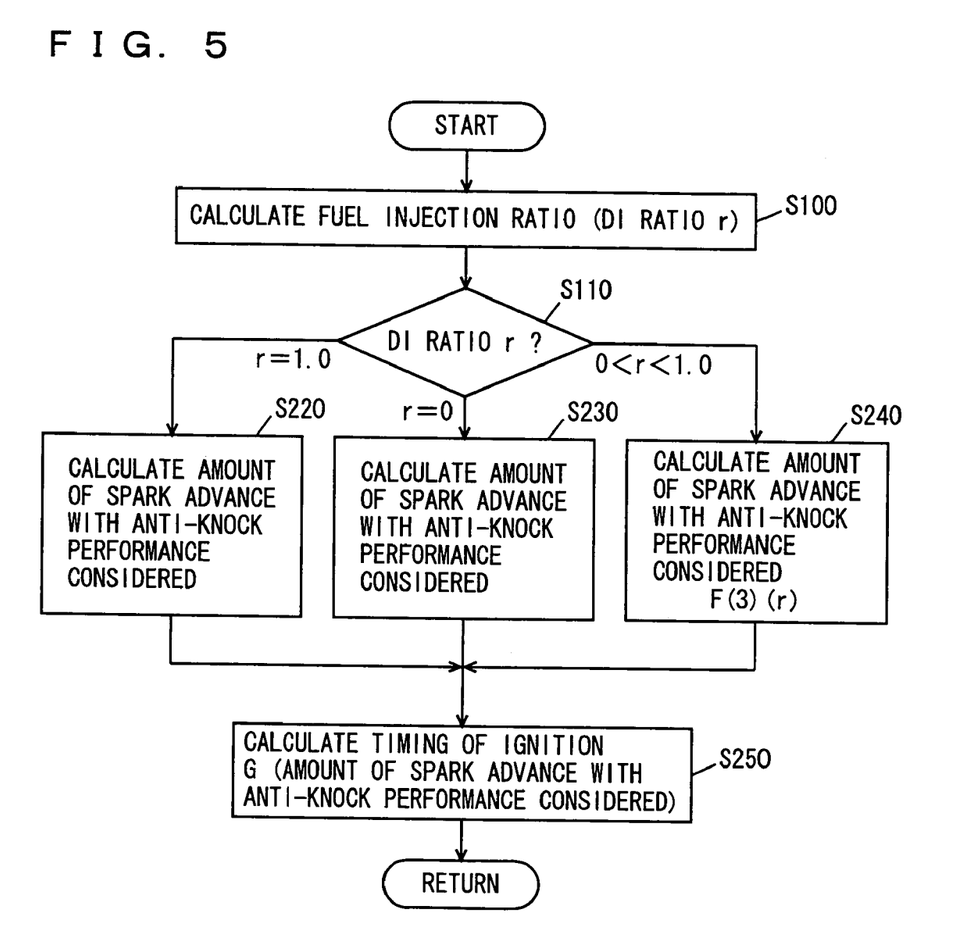
FIG. 5 is a flowchart (2) of a program executed by the engine ECU.

With reference to the FIG. 5 flowchart the FIG. 1 engine ECU 300 executes a program having a structure for control, as described hereinafter. Note that in the FIG. 5 flowchart, the steps identical to those of the FIG. 2 flowchart are identically labeled.

At S220 engine ECU 300 calculates in accordance with the first map corresponding to DI ratio r=1 an amount of spark advance with anti-knock performance considered.

At S230 engine ECU 300 calculates in accordance with the second map corresponding to DI ratio r=0 an amount of spark advance with anti-knock performance considered.

At S240 engine ECU 300 calculates in accordance with the third map corresponding to 0<DI ratio r<1 an amount of spark advance with anti-knock performance considered. More specifically for example function F(3) is used to calculate an amount of spark advance=F(3)(r) with anti-knock performance considered, wherein r represents a DI ratio.

At S250 engine ECU 300 calculates a timing of ignition. More specifically for example function G is used to calculate the timing of ignition=G (an amount of spark advance with anti-knock performance considered).

Thus, not only for cold state, three maps (DI ratio r=1, 0, or larger than 0 and smaller than 1)can be selected in accordance with DI ratio r and the selected map used to calculate a reference timing of ignition. This allows an appropriate reference timing of ignition to be calculated corresponding to DI ratio r. Thus an optimal reference timing of ignition can be set corresponding to DI ratio r, and detriments attributed to excessive spark retard and advance can be prevented.

Engine (1) Suitable for Application of the Control Apparatus

An engine (1) suitable for application of the control apparatus in the present embodiment will be described hereinafter.

Figure 6:
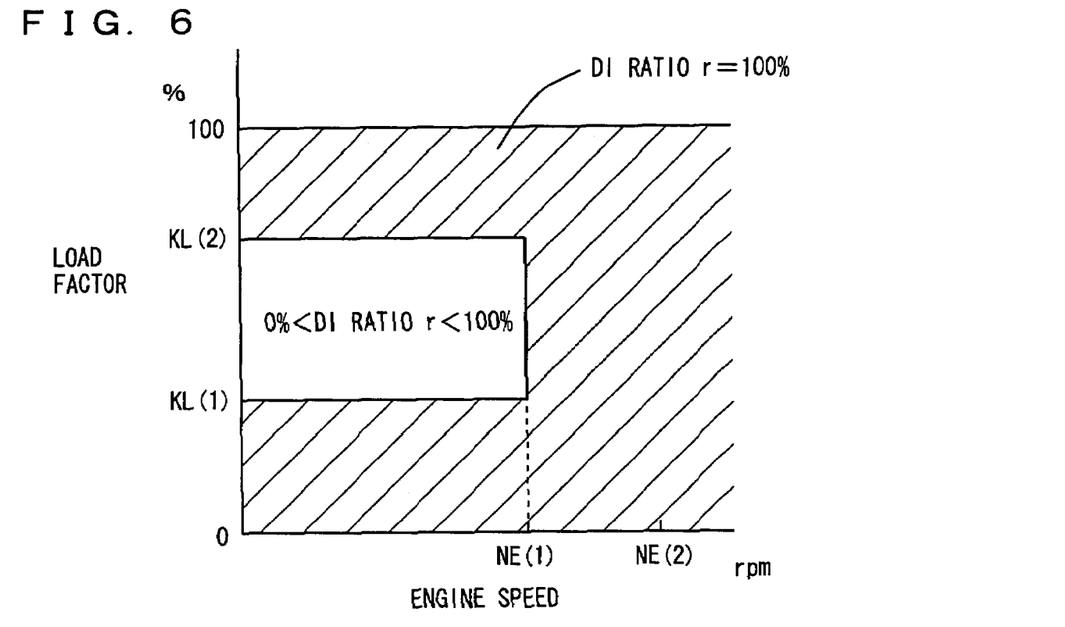
FIG. 6 is a diagram (1) representing a DI ratio map for a warm state of an engine to which the present control apparatus is suitably applied.
Figure 7:
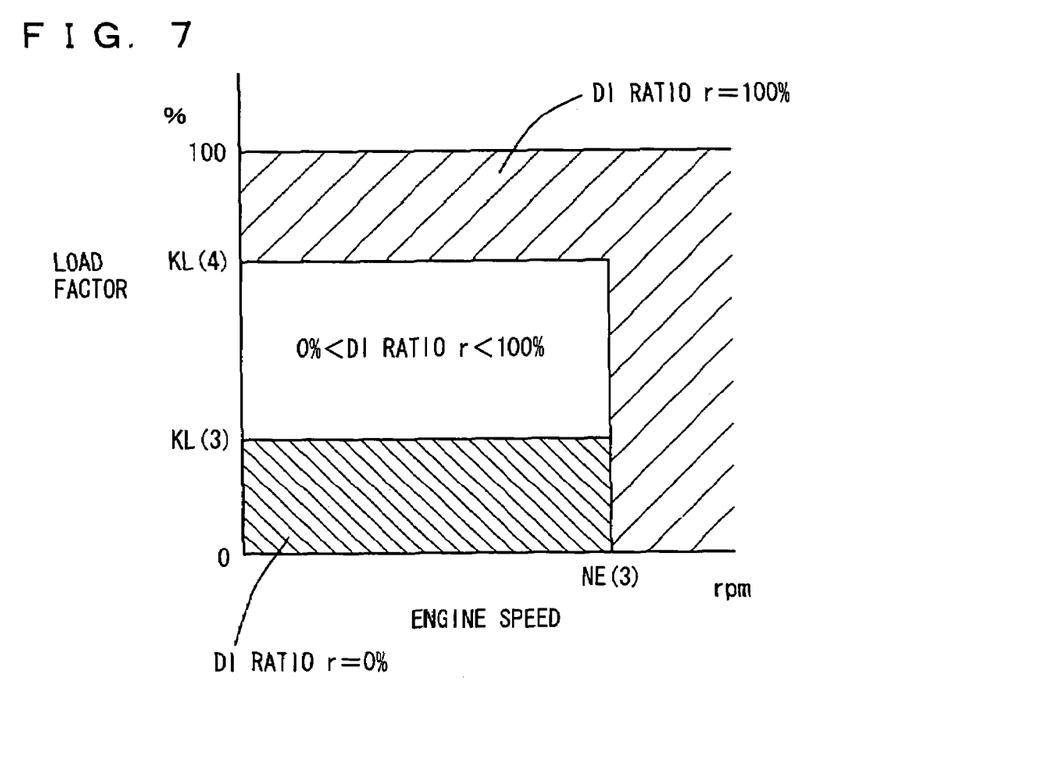
FIG. 7 is a diagram (1) representing a DI ratio map for a cold state of an engine to which the present control apparatus is suitably applied.

Referring to FIGS. 6 and 7, maps each indicating a fuel injection ratio between in-cylinder injector 110 and intake manifold injector 120, identified as information associated with an operation state of engine 10, will now be described. Herein, the fuel injection ratio between the two injectors will also be expressed as a ratio of the quantity of the fuel injected from in-cylinder injector 110 to the total quantity of the fuel injected, which is referred to as the "fuel injection ratio of in-cylinder injector 110", or, a "DI (Direct Injection) ratio (r)". The maps are stored in ROM 320 of engine ECU 300. FIG. 6 shows the map for the warm state of engine 10, and FIG. 7 shows the map for the cold state of engine 10.

In the maps shown in FIGS. 6 and 7, with the horizontal axis representing an engine speed of engine 10 and the vertical axis representing a load factor, the fuel injection ratio of in-cylinder injector 110, or the DI ratio r, is expressed in percentage.

As shown in FIGS. 6 and 7, the DI ratio r is set for each operation region that is determined by the engine speed and the load factor of engine 10. "DI RATIO r=100%" represents the region where fuel-injection is carried out using only in-cylinder injector 110, and "DI RATIO r=0%" represents the region where fuel injection is carried out using only intake manifold injector 120. "DI RATIO r≠0%", "DI RATIO r≠100%" and "0%<DI RATIO r<100%" each represent the region where fuel injection is carried out using both in-cylinder injector 110 and intake manifold injector 120. Generally, in-cylinder injector 110 contributes to an increase of output performance, while intake manifold injector 120 contributes to uniformity of the air-fuel mixture. These two kinds of injectors having different characteristics are appropriately selected depending on the engine speed and the load factor of engine 10, so that only homogeneous combustion is conducted in the normal operation state of engine 10 (other than the abnormal operation state such as a catalyst warm-up state during idling, for example).

Further, as shown in FIGS. 6 and 7, the fuel injection ratio between in-cylinder injector 110 and intake manifold injector 120 is defined as the DI ratio r, individually in the maps for the warm state and the cold state of the engine. The maps are configured to indicate different control regions of in-cylinder injector 110 and intake manifold injector 120 as the temperature of engine 10 changes. When the temperature of engine 10 detected is equal to or higher than a predetermined temperature threshold value, the map for the warm state shown in FIG. 6 is selected; otherwise, the map for the cold state shown in FIG. 7 is selected. One or both of in-cylinder injector 110 and intake manifold injector 120 are controlled based on the selected map and according to the engine speed and the load factor of engine 10.

The engine speed and the load factor of engine 10 set in FIGS. 6 and 7 will now be described. In FIG. 6, NE(1) is set to 2500 rpm to 2700 rpm, KL(1) is set to 30% to 50%, and KL(2) is set to 60% to 90%. In FIG. 7, NE(3) is set to 2900 rpm to 3100 rpm. That is, NE(1)<NE(3). NE(2) in FIG. 6 as well as KL(3) and KL(4) in FIG. 7 are also set as appropriate.

When comparing FIG. 6 and FIG. 7, NE(3) of the map for the cold state shown in FIG. 7 is greater than NE(1) of the map for the warm state shown in FIG. 6. This shows that, as the temperature of engine 10 is lower, the control region of intake manifold injector 120 is expanded to include the region of higher engine speed. That is, when engine 10 is cold, deposits are unlikely to accumulate in the injection hole of in-cylinder injector 110 (even if the fuel is not injected from in-cylinder injector 110). Thus, the region where the fuel injection is to be carried out using intake manifold injector 120 can be expanded, to thereby improve homogeneity.

When comparing FIG. 6 and FIG. 7, "DI RATIO r=100%" holds in the region where the engine speed of engine 10 is equal to or higher than NE(1) in the map for the warm state, and in the region where the engine speed is NE(3) or higher in the map for the cold state. Further, "DI RATIO r=100%" holds in the region where the load factor is KL(2) or greater in the map for the warm state, and in the region where the load factor is KL(4) or greater in the map for the cold state. This means that fuel injection is carried out using only in-cylinder injector 110 in the region where the engine speed is at a predetermined high level, and that fuel injection is carried out using only in-cylinder injector 110 in the region where the engine load is at a predetermined high level, since for the high speed region and the low load region the engine 10 speed and load are high and a large quantity of air is intaken, and in-cylinder injector 110 can singly be used to inject fuel to provide a homogeneous air fuel mixture. In this case, the fuel injected from in-cylinder injector 110 is atomized within the combustion chamber involving latent heat of vaporization (by absorbing heat from the combustion chamber). Accordingly, the temperature of the air-fuel mixture is decreased at the compression side, and thus, the antiknock performance improves. Further, with the temperature of the combustion chamber decreased, intake efficiency improves, leading to high power output.

In the map for the warm state in FIG. 6, fuel injection is also carried out using only in-cylinder injector 110 when the load factor is KL(1) or less. This shows that in-cylinder injector 110 alone is used in a predetermined low load region when the temperature of engine 10 is high. When engine 10 is in the warm state, deposits are likely to accumulate in the injection hole of in-cylinder injector 110. However, when fuel injection is carried out using in-cylinder injector 110, the temperature of the injection hole can be lowered, whereby accumulation of deposits is prevented. Further, clogging of in-cylinder injector 110 may be prevented while ensuring a minimum fuel injection quantity thereof. Thus, in-cylinder injector 110 alone is used in the relevant region.

When comparing FIG. 6 and FIG. 7, there is a region of "DI RATIO r=0%" only in the map for the cold state in FIG. 7. This shows that fuel injection is carried out using only intake manifold injector 120 in a predetermined low load region (KL(3) or less) when the temperature of engine 10 is low. When engine 10 is cold and low in load and the intake air quantity is small, atomization of the fuel is unlikely to occur. In such a region, it is difficult to ensure favorable combustion with the fuel injection from in-cylinder injector 110. Further, particularly in the low-load and low-speed region, high power output using in-cylinder injector 110 is unnecessary. Accordingly, fuel injection is carried out using intake manifold injector 120 alone, rather than using in-cylinder injector 110, in the relevant region.

Further, in an operation other than the normal operation, i.e., in the catalyst warm-up state at idle of engine 10 (abnormal operation state), in-cylinder injector 110 is controlled to carry out stratified charge combustion. By causing the stratified charge combustion during the catalyst warm-up operation, warming up of the catalyst is promoted, and exhaust emission is thus improved.

Engine (2) Suitable for Application of the Control Apparatus

An engine (2) suitable for application of the control apparatus in the present embodiment will be described hereinafter. In the following description of engine (2) the same description as that of engine (1) will not be repeated.

Figure 8:
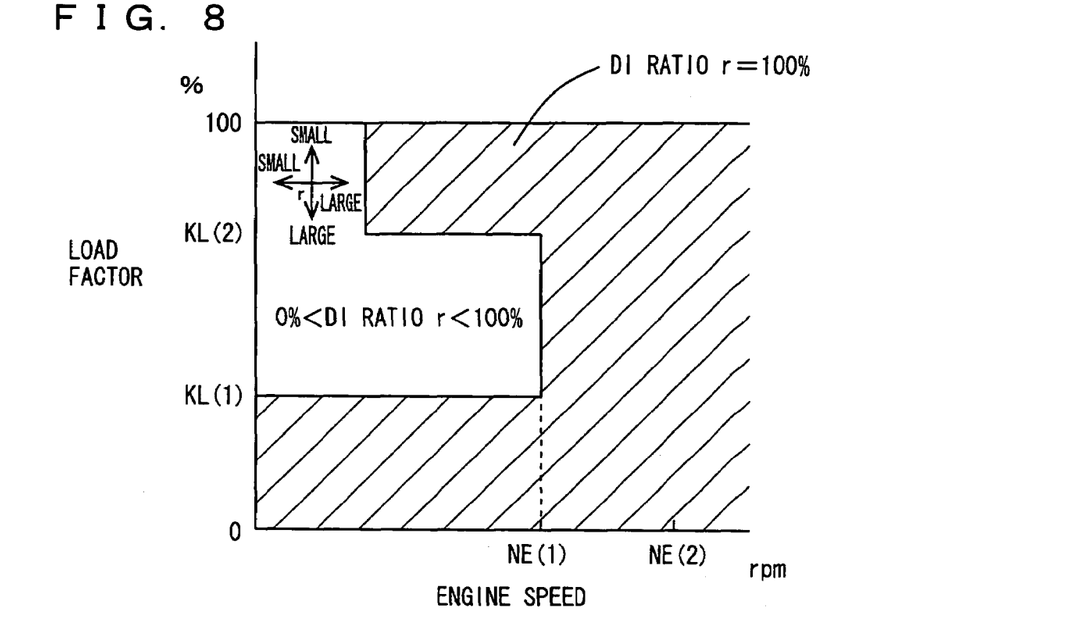
FIG. 8 is a diagram (2) representing a DI ratio map for a warm state of an engine to which the present control apparatus is suitably applied.
Figure 9:
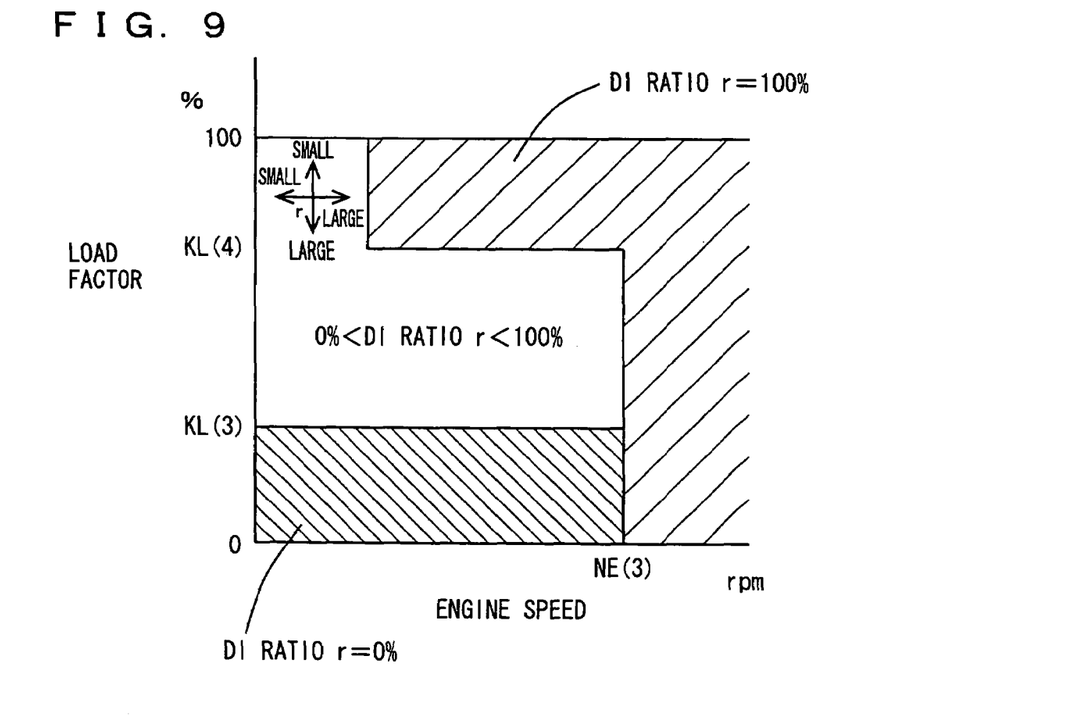
FIG. 9 is a diagram (2) representing a DI ratio map for a cold state of an engine to which the present control apparatus is suitably applied.

Referring to FIGS. 8 and 9, maps each indicating a fuel injection ratio between in-cylinder injector 110 and intake manifold injector 120, identified as information associated with an operation state of engine 10, will now be described. The maps are stored in ROM 320 of engine ECU 300. FIG. 8 shows the map for the warm state of engine 10, and FIG. 9 shows the map for the cold state of engine 10.

When comparing FIG. 8 and FIG. 9, the figures differ from FIGS. 6 and 7, as follows: "DI RATIO r=100%" holds in the region where the engine speed of engine 10 is equal to or higher than NE(1) in the map for the warm state, and in the region where the engine speed is NE(3) or higher in the map for the cold state. Further, except for the low-speed region, "DI RATIO r=100%" holds in the region where the load factor is KL(2) or greater in the map for the warm state, and in the region where the load factor is KL(4) or greater in the map for the cold state. This means that fuel injection is carried out using only in-cylinder injector 110 in the region where the engine speed is at a predetermined high level, and that fuel injection is often carried out using only in-cylinder injector 110 in the region where the engine load is at a predetermined high level. However, in the low-speed and high-load region, mixing of an air-fuel mixture formed by the fuel injected from in-cylinder injector 110 is poor, and such inhomogeneous air-fuel mixture within the combustion chamber may lead to unstable combustion. Accordingly, the fuel injection ratio of in-cylinder injector 110 is increased as the engine speed increases where such a problem is unlikely to occur, whereas the fuel injection ratio of in-cylinder injector 110 is decreased as the engine load increases where such a problem is likely to occur. These changes in the fuel injection ratio of in-cylinder injector 110, or, the DI ratio r, are shown by crisscross arrows in FIGS. 8 and 9. In this manner, variation in output torque of the engine attributable to the unstable combustion can be suppressed. It is noted that these measures are approximately equivalent to the measures to decrease the fuel injection ratio of in-cylinder injector 110 as the state of the engine moves toward the predetermined low speed region, or to increase the fuel injection ratio of in-cylinder injector 110 as the engine state moves toward the predetermined low load region. Further, except for the relevant region (indicated by the crisscross arrows in FIGS. 8 and 9), in the region where fuel injection is carried out using only in-cylinder injector 110 (on the high speed side and on the low load side), a homogeneous air-fuel mixture is readily obtained even when the fuel injection is carried out using only in-cylinder injector 110. In this case, the fuel injected from in-cylinder injector 110 is atomized within the combustion chamber involving latent heat of vaporization (by absorbing heat from the combustion chamber). Accordingly, the temperature of the air-fuel mixture is decreased at the compression side, and thus, the antiknock performance improves. Further, with the temperature of the combustion chamber decreased, intake efficiency improves, leading to high power output.

In engine 10 described with reference to FIGS. 6-9, homogeneous combustion is achieved by setting the fuel injection timing of in-cylinder injector 110 in the intake stroke, while stratified charge combustion is achieved by setting it in the compression stroke. That is, when the fuel injection timing of in-cylinder injector 110 is set in the compression stroke, a rich air-fuel mixture can be located locally around the spark plug, so that a lean air-fuel mixture in the combustion chamber as a whole is ignited to realize the stratified charge combustion. Even if the fuel injection timing of in-cylinder injector 110 is set in the intake stroke, stratified charge combustion can be realized if it is possible to locate a rich air-fuel mixture locally around the spark plug.

As used herein, the stratified charge combustion includes both the stratified charge combustion and semi-stratified charge combustion. In the semi-stratified charge combustion, intake manifold injector 120 injects fuel in the intake stroke to generate a lean and homogeneous air-fuel mixture in the whole combustion chamber, and then in-cylinder injector 110 injects fuel in the compression stroke to generate a rich air-fuel mixture around the spark plug, so as to improve the combustion state. Such semi-stratified charge combustion is preferable in the catalyst warm-up operation for the following reasons. In the catalyst warm-up operation, it is necessary to considerably retard the ignition timing and maintain favorable combustion state (idling state) so as to cause a high-temperature combustion gas to reach the catalyst. Further, a certain quantity of fuel needs to be supplied. If the stratified charge combustion is employed to satisfy these requirements, the quantity of the fuel will be insufficient. With the homogeneous combustion, the retarded amount for the purpose of maintaining favorable combustion is small compared to the case of stratified charge combustion. For these reasons, the above-described semi-stratified charge combustion is preferably employed in the catalyst warm-up operation, although either of stratified charge combustion and semi-stratified charge combustion may be employed.

Furthermore in the engine described with reference to FIGS. 6-9 preferably in-cylinder injector 110 is timed to inject fuel at the compression stroke for the following reason, although in engine 10 described above, the fuel injection timing of in-cylinder injector 110 is set in the intake stroke in a basic region corresponding to the almost entire region (herein, the basic region refers to the region other than the region where semi-stratified charge combustion is conducted by causing intake manifold injector 120 to inject the fuel in the intake stroke and causing in-cylinder injector 110 to inject the fuel in the compression stroke, which is conducted only in the catalyst warm-up state). The fuel injection timing of in-cylinder injector 110, however, may be set temporarily in the compression stroke for the purpose of stabilizing combustion, for the following reasons.

When the fuel injection timing of in-cylinder injector 110 is set in the compression stroke, the air-fuel mixture is cooled by the injected fuel while the temperature in the cylinder is relatively high. This improves the cooling effect and, hence, the antiknock performance. Further, when the fuel injection timing of in-cylinder injector 110 is set in the compression stroke, the time from the fuel injection to the ignition is short, which ensures strong penetration of the injected fuel, so that the combustion rate increases. The improvement in antiknock performance and the increase in combustion rate can prevent variation in combustion, and thus, combustion stability is improved.

Note that in the above described flowchart at S150 and S250 whenever the flowchart is executed a reference timing of ignition may be calculated from the engine 10 operation state and function g correcting the reference timing of ignition by an amount of cold state spark advance may be used to calculate a timing of ignition.

Furthermore, irrespectively of the engine 10 temperature (i.e., in either a warm state or a cold state) when idling is off (i.e., an idle switch is off, the accelerator pedal is pressed) the FIG. 6 or 8 map for a warm state may be used. (Regardless of cold or warm state, in-cylinder injector 110 is used for a low load range.)

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control apparatus for an internal combustion engine having a first fuel injection mechanism injecting fuel into a cylinder and a second fuel injection mechanism injecting the fuel into an intake manifold, comprising:
    a controller controlling said first and second fuel injection mechanisms to bear shares, respectively, of injecting the fuel at a ratio calculated as based on a condition required for said internal combustion engine continuously throughout engine operation, said ratio including preventing one of said fuel injection mechanisms from injecting the fuel; and
    an ignition timing controller detecting engine temperature and controlling an ignition device to vary a timing of ignition, wherein said ignition timing controller controls said ignition device, as based on a reference timing of ignition of said internal combustion engine determined from said ratio and temperature.

2. The control apparatus according to claim 1, wherein said first fuel injection mechanism is an in-cylinder injector and said second fuel injection mechanism is an intake manifold injector.

3. A control apparatus for an internal combustion engine having a first fuel injection mechanism injecting fuel into a cylinder and a second fuel injection mechanism injecting the fuel into an intake manifold, comprising:
    a controller controlling said first and second fuel injection mechanisms to bear shares, respectively, of injecting the fuel at a ratio calculated as based on a condition required for said internal combustion engine continuously throughout engine operation, said ratio including preventing one of said fuel injection mechanisms from injecting the fuel;
    a storage storing a reference timing of ignition; and
    an ignition timing controller detecting engine temperature and employing said reference timing of ignition to control an ignition device, wherein said storage stores said reference timing of ignition calculated as based on said ratio and temperature.

4. The control apparatus according to claim 3, wherein said storage stores in a form of a map said reference timing of ignition previously calculated as based on said ratio.

5. The control apparatus according to claim 4, wherein said storage stores said reference timing of ignition divided into a first map applied when said first fuel injection mechanism alone injects the fuel, a second map applied when said second fuel injection mechanism alone injects the fuel, and a third map applied when said first and second fuel injection mechanisms inject the fuel.

6. The control apparatus according to claim 5, wherein said first map provides said reference timing of ignition set to provide spark advance.

7. The control apparatus according to claim 5, wherein said second map provides said reference timing of ignition set to provide spark retard.

8. The control apparatus according to claim 5, wherein said third map provides said reference timing of ignition set to provide spark advance when said first fuel injection mechanism is increased in said ratio.

9. The control apparatus according to claim 5, wherein said third map provides said reference timing of ignition set to provide spark retard when said second fuel injection mechanism is increased in said ratio.

10. A control apparatus for an internal combustion engine having first fuel injection means for injecting fuel into a cylinder and second fuel injection means for injecting the fuel into an intake manifold, comprising:
    control means for controlling said first and second fuel injection means to bear shares, respectively, of injecting the fuel at a ratio calculated as based on a condition required for said internal combustion engine continuously throughout engine operation, said ratio including preventing one of said fuel injection means from injecting the fuel; and
    ignition timing control means for detecting engine temperature and controlling an ignition device to vary a timing of ignition, wherein said ignition timing control means includes means for controlling said ignition device, as based on a reference timing of ignition of said internal combustion engine determined from said ratio and temperature.

11. The control apparatus according to claim 10, wherein said first fuel injection means is an in-cylinder injector and said second fuel injection means is an intake manifold injector.

12. A control apparatus for an internal combustion engine having first fuel injection means for injecting fuel into a cylinder and second fuel injection means for injecting the fuel into an intake manifold, comprising:

control means for controlling said first and second fuel injection means to bear shares, respectively, of injecting the fuel at a ratio calculated as based on a condition required for said internal combustion engine continuously throughout engine operation, said ratio including preventing one of said fuel injection means from injecting the fuel;

storage means for storing a reference timing of ignition; and ignition timing control means detecting engine temperature and employing said reference timing of ignition for controlling an ignition device, wherein said storage means includes means for storing said reference timing of ignition calculated as based on said ratio and temperature.

13. The control apparatus according to claim 12, wherein said storage means includes means for storing in a form of a map said reference timing of ignition previously calculated as based on said ratio.

14. The control apparatus according to claim 13, wherein said storage means includes means for storing said reference timing of ignition divided into a first map applied when said first fuel injection means alone injects the fuel, a second map applied when said second fuel injection means alone injects the fuel, and a third map applied when said first and second fuel injection means inject the fuel.

15. The control apparatus according to claim 14, wherein said first map provides said reference timing of ignition set to provide spark advance.

16. The control apparatus according to claim 14, wherein said second map provides said reference timing of ignition set to provide spark retard.

17. The control apparatus according to claim 14, wherein said third map provides said reference timing of ignition set to provide spark advance when said first fuel injection means is increased in said ratio.

18. The control apparatus according to claim 14, wherein said third map provides said reference timing of ignition set to provide spark retard when said second fuel injection means is increased in said ratio.

* * * * *